ANALOG-TO-DIGITAL CONVERTER

Filed March 22, 1965 2 Sheets-Sheet 1

INVENTOR
DAVID M. BARTON

BY Sughrue, Rothwell, Mion, Zinn, & Macpeak

ATTORNEYS

Dec. 3, 1968 D. M. BARTON 3,414,898

ANALOG-TO-DIGITAL CONVERTER

Filed March 22, 1965 2 Sheets-Sheet 2

INVENTOR
DAVID M. BARTON

BY Hughes, Rothwell, Mion, Zinn & Macpeak

ATTORNEYS.

United States Patent Office 3,414,898
Patented Dec. 3, 1968

3,414,898
ANALOG-TO-DIGITAL CONVERTER

David M. Barton, Bridgeton, Mo., assignor to Monsanto Company, St. Louis, Mo., a corporation of Delaware Filed Mar. 22, 1965, Ser. No. 441,770
5 Claims. (Cl. 340—347)

ABSTRACT OF THE DISCLOSURE

A floating storage capacitor is connected periodically between a pair of input terminals to receive an analog input voltage. During alternate periods, the storage capacitor is connected between ground or reference potential and an input terminal to an operational amplifier with capactive feedback. A charge which is transferred to the feedback capacitor is removed linearly by a constant current generator connected thereto. As a result of the linear discharge of the capacitor, the time it takes for the capacitor to discharge down to some predetermined level is directly proportional to the analog input voltage. Pulses at a predetermined rate are counted during the time of discharge thereby resulting in a digital count proportional to the analog input voltage.

The present invention relates to an electronic converter for converting analog signals into a plurality of digital pulses representative of the analog signal.

One type of analog-to-digital converter, known in the prior art, uses an integrating capacitor which integrates in a first direction at a rate dependent upon the amplitude of the analog input signal, and integrates in the opposite direction at a constant rate due to discharge of the integrating capacitor by a constant current generator. Since the initial value of signal across the integrating capacitor at the start of the discharge period is proportional to the analog input signal, and further since the discharge rate is constant, the period of discharge is proportional to the value of the analog input signal. In such systems, means are provided for determining the beginning and end of the discharge period and further means are provided for sending pulses to a counter during that period.

In the above-described system, high common mode rejection may be obtained only by floating active networks in the system. For example, the amplifiers and power supplies for a system of the above-described type would have to be floated rather than grounded. This is a relatively difficult, complex, and expensive procedure.

The present invention overcomes these problems by providing, in an analog-to-digital converter generally of the type described above, a passive storage network which is used to transfer charge into the integrating capacitor. The unique feature of transferring charge from a storage means to the integrating capacitor, rather than integrating in a first direction at a rate dependent upon the analog input signal as is done in the prior art analog-to-digital converters, allows the use of a common mode rejection network, providing a high common mode rejection, without the necessity of floating active circuits in the converter. In the present invention, the only network which has to be floated is the input passive network which includes a storage capacitor and a few resistors. Floating a passive network is neither difficult nor complex as compared to floating an active network.

In a preferred embodiment, the invention includes an operational amplifier having capacitive feedback and a substantially zero input impedance. A storage capacitor is charged up to the analog input signal and then blocked from the input and connected to the operational amplifier. A current limiting resistor is provided between the storage capacitor and the input to the operational amplifier, and since the input impedance of the operational amplifier is substantially zero the storage capacitor sees only a resistive impedance which appears to be connected to ground, and substantially the entire charge on the storage capacitor is transferred to the feedback capacitor of the operational amplifier. The storage capacitor is then blocked from the input to the operational amplifier, and the charge on the feedback capacitor, which is proportional to the analog input signal, is removed by a constant current generator at a constant rate. The time for discharge is thus proportional to the amplitude of the analog input signal and digital pulses are fed to a counter during the discharge period.

It should be noted that the feature of transferring charge from a first storage capacitor to the feedback capacitor of an operational amplifier is not the same as using the feedback capacitor as an integrator. In the second case, known in the prior art, where the input signal is connected to the input of the operational amplifier, the charge per unit time (current) transferred to the feedback capacitor is a function of the amplitude of the input signal and is constant for a given input. Consequently, the slope of the voltage across the feedback capacitor is constant for a constant input amplitude, thus approximately fairly accurately an integrating function.

However, if the charge on a storage capacitor is transferred to the feedback capacitor, as is done in the present invention, the charge per unit time which builds up on the feedback capacitor varies exponentially notwithstanding a constant amplitude analog input. Thus, the shape of the the voltage rise across the feedback capacitor is independent of the input amplitude. Consequently, it is apparent that the operational amplifier with the feedback capacitance does not approximate an integrating function during the period of charge transfer.

It is therefore an object of the present invention to provide a new and improved converter for converting an analog input signal into a plurality of pulses representative of the analog input signal.

It is a further object of the present invention to provide a new and improved analog-to-digital converter having high common mode input rejection and no floated active circuits.

The foregoing and other objects, features and advantages of the invention will be apparent from the following more particular description of a preferred embodiment of the invention, as illustrated in the accompanying drawings.

Figure 1:
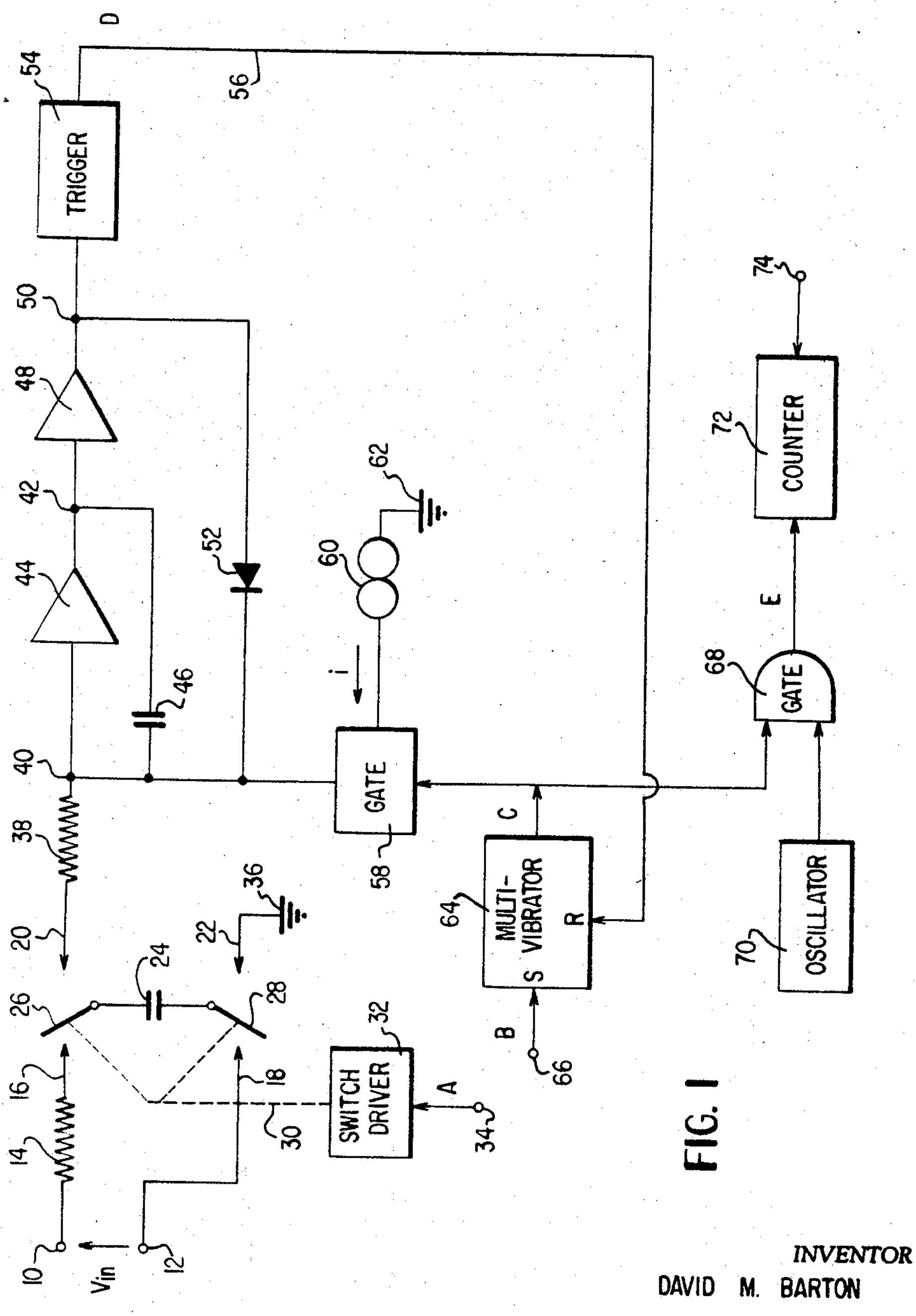
FIGURE 1 is a partially schematic and partial block diagram of a preferred embodiment of the invention.

In FIGURE 1, the analog input signal is applied across input terminals 10 and 12. Terminal 10 is connected via current limiting resistor 14 to stationary contact 16. Terminal 12 is connected to stationary contact 18. A storage capacitor 24 is connected by means of a double-pole double-throw switch comprising movable contact arms 26 and 28, to stationary contacts 16 and 18, respectively, or stationary contacts 20 and 22 respectively. The double-pole double-throw switch is controlled by a switch driver 32 which is linked by means of a linkage 30 to movable contact arms 26 and 28. Switch driver 32 may be controlled by an input signal A at point 34. The switch driver 32 may be one of a variety of elements to control movable switches such as a reed switch or a relay driver. Stationary contact 22 is connected to ground at point 36 and stationary contact 20 is connected to summing junction 40 via current limiting resistor 38.

It should be noted that the double-pole double-throw switching action may be implemented optically, electro-optically, electronically or electro-mechanically.

Also connected to summing junction 40 is the input of an operational amplifier comprising a high gain inverting amplifier 44 and a capacitive feedback element 46. The output 42 from the operational amplifier is applied to a trigger circuit 54 via a non-inverting amplifier 48.

The trigger circuit 54 may be any conventional circuit such as a comparator, detector, peak detector, or Schmitt trigger, which is capable of providing a pulse output when the input signal reaches a predetermined set voltage. The input to the trigger circuit 54 is clamped by a diode 52 which is connected between point 50 and summing junction 40. A constant current source 60 is connected to summing junction 40 through gate 58. The other side of constant current source 60 is connected to ground at point 62. The gate 58 is controlled by the output of a set-reset multivibrator 64. Multivibrator 64 may be of any conventional type which produces two stable outputs commonly known as "set" and "reset" in response to set and reset trigger pulses respectively. For example, in the embodiment disclosed, as will appear hereafter, multivibrator 64 provides a positive polarity output in response to a set input at point 66 and provides a negative polarity output in response to a reset input at the reset terminal. The output from multivibrator 64 also controls AND gate 68 which passes pulses from oscillator 70 to counter 72. Counter 72 may be reset by applying the proper signal at input 74.

Figure 2:
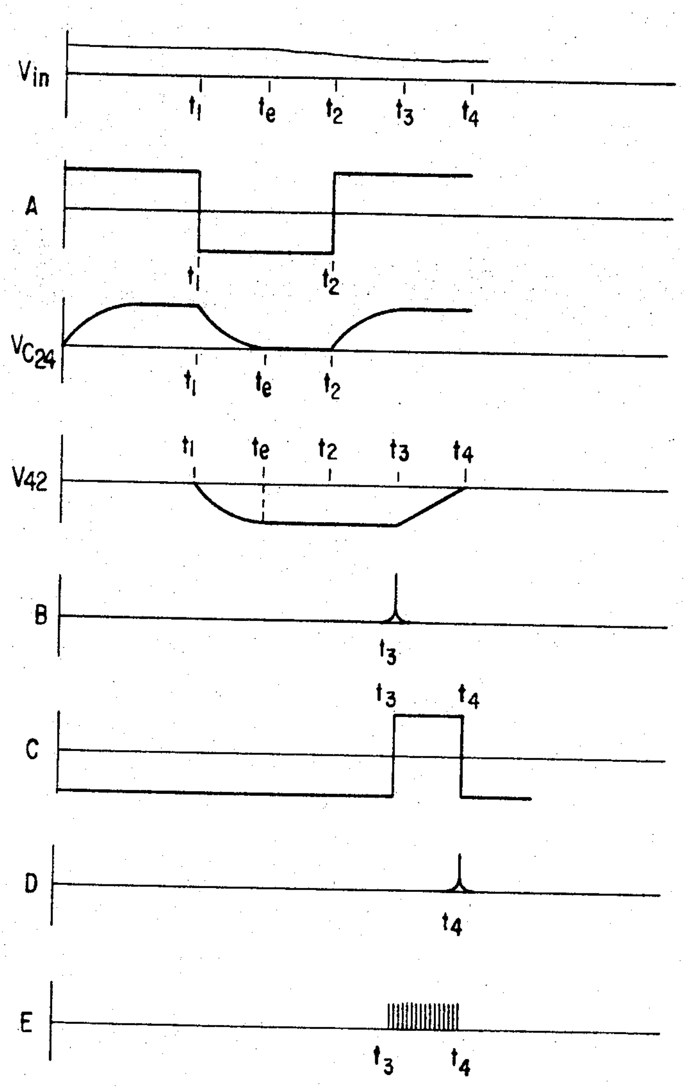
FIGURE 2 is a series of wave forms helpful in explaining the operation of the preferred embodiment shown in FIGURE 1.

The operation of FIGURE 1 will be explained with reference to the wave forms shown in FIGURE 2 wherein $V_{in}$ is the analog voltage applied across terminals 10 and 12, A is the signal which controls switch driver 32, $V_{C24}$ is the voltage across capacitor 24, $V_{42}$ is the voltage output of the operational amplifier, B is the signal input to the set terminal of multivibrator 64, C is the output of multivibrator 64, D is the output from trigger circuit 54, and E is the output from AND gate 68.

As is well known in the art, when it is desired to measure or use in any way the analog difference signal appearing across two input terminals, a portion of the circuit must be floated rather than connected to ground. Due to the unique charge transfer feature of the instant invention, only the passive network, comprising storage capacitor 24, resistor 14 and input terminals 10 and 12, needs to be floated.

During the initial period of operation, the signal A at point 34 is positive and for purposes of explanation it is assumed that a positive signal closes movable contacts 26 and 28 to stationary contacts 16 and 18, respectively. During this time, as shown by waveform $V_{C24}$, the capacitor 24 charges exponentially to a voltage which is equal to the analog input $V_{in}$. Due to the combination of current limiting resistor 14 and storage capacitor 24, the input network has some inherent time averaging capabilities and therefore rejects any unwanted spikes or high noise pulses which would otherwise interfere with the accuracy of the converter. The only time requirement for charging capacitor 24 is that the initial period be long enough for the exponential curve $V_{C24}$ to reach the value of the analog input signal.

At time $t_1$, the signal A applied to switch driver 32 drops to a negative polarity closing movable contacts 26 and 28 to stationary contacts 20 and 22, respectively. When this occurs, the storage capacitor 24 is connected at one end to ground and at the other end to summing junction 40 via resistor 38. It should be noted at this point that inverting amplifier 44 is selected to have a high gain and substantially zero input impedance. Since summing junction 40 is at near zero voltage, the capacitor 24 electrically sees only a resistive impedance 38 which appears to be connected to ground. Consequently, substantially all of the charge on capacitor 24, which is proportional to the analog input voltage, is transferred to integrating capacitor 46. The time constant for the charge transfer circuit is $R_{38}C_{24}$, and it is necessary that capacitor 24 be connected to the input of the operational integrating amplifier for a time which is equal to a large number of time constants. This is necessary to transfer the entire charge to capacitor 46. During this period, as shown by curve $V_{C24}$, and curve $V_{42}$, the voltage across capacitor 24 decays exponentially to substantially zero volts and remains there until capacitor 24 is again connected to the input. Also, the voltage at point 42 charges negatively in an exponential fashion due to the charge transfer until all the charge is transferred at time $t_e$.

At time $t_2$, capacitor 24 is again connected to the input and begins charging as shown in curve $V_{C24}$. However, the voltage at point 42 remains constant at a value proportional to the analog input signal until gate 58 becomes unblocked.

At time $t_3$, which may be any time after $t_2$ or substantially coincident therewith, a pulse B appears at point 66 and initiates multivibrator 64 to provide a positive output signal as shown in curve C. The output signal from multivibrator 64 unblocks gates 58 and 68 allowing constant current generator 60 to be connected to summing junction 40 and oscillator 70 to be connected to the input of counter 72. It should be noted that counter 72 should be reset by the proper signal at input 74 prior to the passage of pulses through gate 68. When constant current generator 60 is connected to summing junction 40, a constant current $i$ flows into integrating capacitor 46 and removes the charge stored thereon at a constant rate as indicated by the voltage change at point 42 from times $t_3$ to $t_4$ as indicated by wave form $V_{42}$ in FIGURE 2. When the voltage at point 42 reaches a predetermined limit, in the example described the limit is zero volts, the trigger 54 will fire providing an output pulse D at time $t_4$.

The trigger pulse output from trigger circuit 54 is applied via lead 56 to the reset input R of multivibrator 64. As seen in FIGURE 2, when triggered by pulse D the output C of multivibrator 64 reverts to its low polarity state and consequently gates 58 and 68 become blocked, thus preventing the passage of further current from source 60 into summing junction 40 and pulses from oscillator 70 into counter 72. The number of pulses passed to counter 72 during the period from times $t_3$ to $t_4$, which is the duration of the output pulse from multivibrator 64, is proportional to the voltage of the analog input signal appearing across terminals 10 and 12 at time $t_1$. It should be noted that the digital pulses which are passed through gate 68 need not be applied to a counter as shown but may be applied to any further utilization means which would electrically operate or perform further operations on the digital pulses.

While the invention has been particularly shown and described with reference to a preferred embodiment thereof, it will be understood by those in the art that various changes in form and details may be made therein without departing from the spirit and scope of the invention.

What is claimed is:

1. A converter for converting an analog input signal at input terminals to a plurality of digital pulses representative of said analog signal comprising (a) a first capacitor, (b) a second capacitor, (c) switch means connected to said first capacitor for connecting said analog input signal to said first capacitor during a first period of time and transferring the charge on said first capacitor to said second capacitor during a second period of time, (d) a timing pulse generator for producing at an output terminal thereof a timing pulse initiated after the termination of said second period of time, (e) discharge means, connected to said latter output terminal and said second capacitor, responsive to said timing pulse for discharging said second capacitor at a constant rate, (f) means, connected to said second capacitor, responsive to the discharge of said second capacitor for producing a trigger pulse when the voltage across said second capacitor reaches a predetermined value, (g) means connecting said trigger pulse to said timing pulse generator for terminating said timing pulse generator for terminating said timing pulse, and (h) means connected to the output terminal of said timing pulse generator responsive to said timing pulse for producing a plurality of pulses during the duration of said timing pulse.

2. A converter for converting an analog input signal to a plurality of digital pulses representative of said analog signal comprising (a) a pair of input terminals for receiving said analog input signal, (b) storage means, (c) an operational amplifier having a feedback capacitor, (d) switch means connected to said storage means for connecting said analog input signal to said storage means during a first period of time and transferring the charge on said storage means to said capacitor during a second period of time, (e) circuit means connected to said operational amplifier for removing said electrical charge from said feedback capacitor at a constant rate of said discharge and for generating digital pulses during the time said electrical charge is being removed at a constant rate.

3. A converter as claimed in claim 2 wherein said switch means comprises (a) a double-pole double-throw switch having first and second movable contacts and first, second, third and fourth stationary contacts, said first and second stationary contacts being connected respectively to said pair of input terminals, said third contact being connected to the input of said operational amplifier and said fourth stationary contact being connected to ground, said movable contacts being connected to opposite sides of said storage means and (b) control means for selectively causing said movable contacts to contact said first and second stationary contacts during a first period and to contact said third and fourth stationary contacts during a period different than said first period.

4. A converter as claimed in claim 3 wherein said storage means is a capacitor.

5. A converter as claimed in claim 4 wherein said circuit means comprises (a) a timing pulse generator, (b) a constant current generator connected to the input of said amplifier through a normally blocked first gate, (c) first means for initiating said timing pulse generator to produce a pulse subsequent to the transfer of charge from said storage means to said feedback capacitor, (d) second means connecting said timing pulse to said normally blocked first gate for unblocking said first gate, (e) third means connected to said operational amplifier responsive to said constant rate of discharge for providing a signal when said feedback capacitor has been discharged to a predetermined value of voltage.

(f) fourth means connected to said third means and said timing pulses generator for connecting said signal to said timing pulse generator for terminating said timing pulse, and (g) fifth means connected to said timing pulse generator responsive to said timing pulse for producing periodic digital pulses during the duration of said timing pulse generator.

References Cited

UNITED STATES PATENTS

| | | | |
|---|---|---|---|
| 3,098,224 | 7/1963 | Hoffman | 340—347 |
| 3,216,002 | 11/1965 | Hoffman | 340—347 |
| 3,251,052 | 3/1966 | Hoffman et al. | 340—347 |

MAYNARD R. WILBUR, *Primary Examiner.*

W. J. KOPACZ, *Assistant Examiner.*